H. HECKMAN.
Thrashing Machine.
No. 36,214.
Patented Aug. 19, 1862.
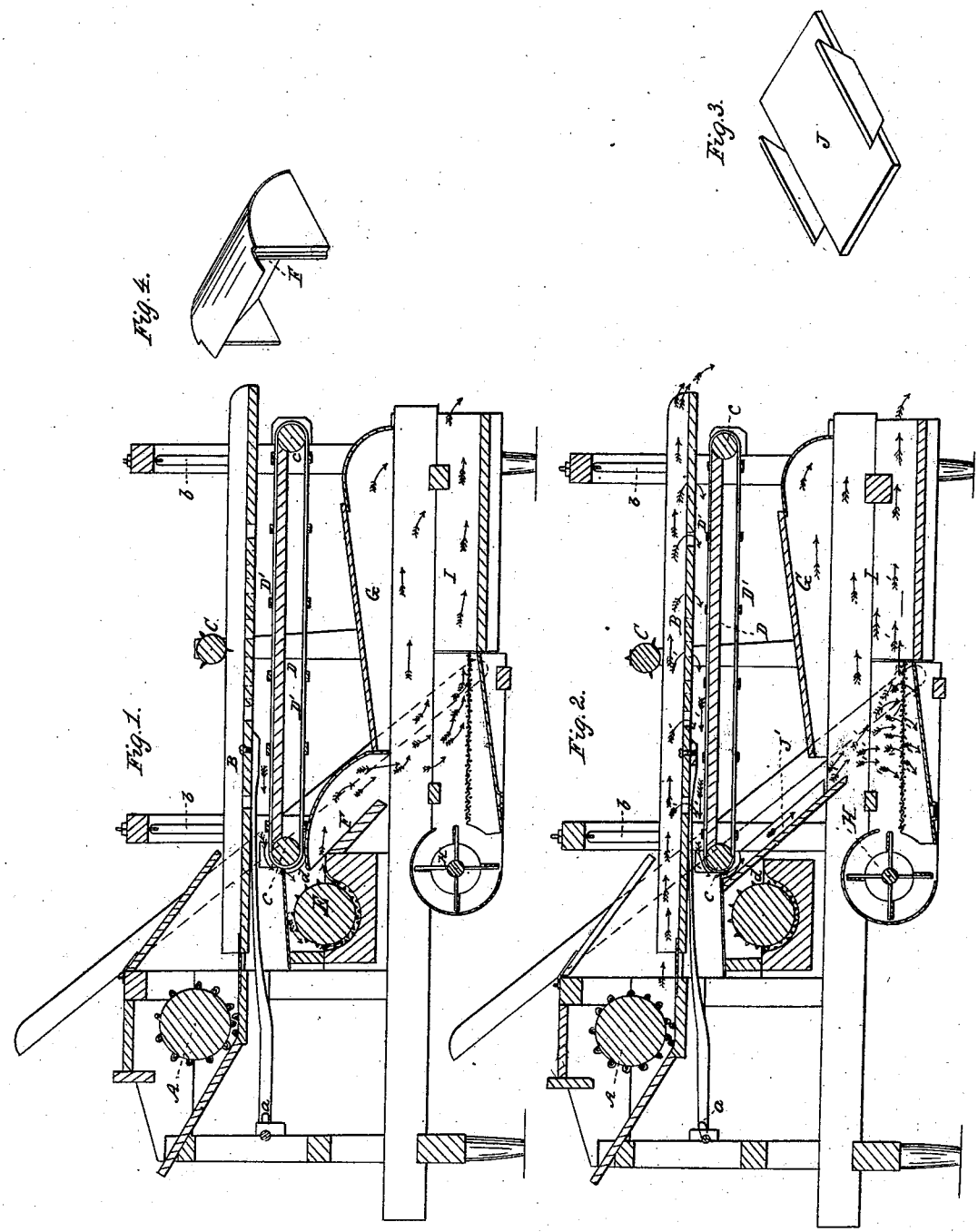

UNITED STATES PATENT OFFICE.

HENRY HECKMAN, OF DANSVILLE, NEW YORK.

IMPROVEMENT IN THRASHING-MACHINES.

Specification forming part of Letters Patent No. 36,214, dated August 19, 1862.

*To all whom it may concern:*

Be it known that I, HENRY HECKMAN, of Dansville, in the county of Livingston and State of New York, have invented a new and useful convertible machine for either thrashing and cleaning grain or thrashing, hulling, and cleaning clover-seed; and I do hereby declare that the following is a full, clear, and exact description of the same, reference being had to the accompanying drawings, forming part of this specification, in which—

Figure 1 is a vertical longitudinal section of the machine as arranged for thrashing, hulling, and cleaning clover-seed. Fig. 2 is a like section of the machine as arranged for thrashing and cleaning grain. Figs. 3 and 4 are perspective views of the devices employed for converting the machine from a clover thrasher, huller, and cleaner into a grain thrasher and cleaner, and vice versa.

The red arrows indicate the course of the grain or seed and the black arrows the course of the straw and chaff.

Similar letters of reference in the several figures indicate corresponding parts.

To enable others skilled in the art to make and use my invention, I will proceed to describe its construction and operation with reference to the drawings.

A designates the thrasher adapted for thrashing grain or clover; B, the separator or perforated apron which receives the thrashed substances, with the straw and chaff, and carries the same toward the back end of the frame, the seed or grain and chaff separating in their travel from the straw and falling through the perforations of the apron, while the straw passes off at the back end of the apron. This apron may be driven by a double crank and be made in two parts, so as to operate with a reaction, instead of being driven by a single crank, $a$, and of being made in one piece, as shown. It of course is suspended by hinged arms $b$, which permit it to vibrate.

C is a revolving picker placed over the central portion of the apron and aiding the separation and motion of the straw, &c.

D is a stationary table, with an endless slatted carrier, D', arranged to revolve around it. At the ends of this table rollers $c\ c$ are placed to ease and insure the revolution of the carrier. Upon this table, between the slats of the carrier, the grain or seeds and the foreign matter fall as they escape from the apron B, and by the slatted carrier they are carried to the end of the table and allowed to descend or fall into the proper place for being further operated upon.

E is the clover-seed huller, arranged just behind and slightly below the rear end of the carrier and between the fan H and the thrasher A, as shown. This huller is made with a mouth or opening, $d$, at its front portion, and is adapted for use in connection with a combined cap and chute, F, which conducts the clover-seed to the hulling-cylinder and therefrom to the sieves of the fanning-mill H I, and also for use in connection with simply a chute, J, which takes the place of the device F and closes the opening $d$ of the huller and conducts the wheat or other grain directly into the fanning-mill H I.

Whenever either of the devices F J are brought into use, the spout portion I of the fanning-mill is closed in by a raised cover, G, so that the chaff, dust, &c., shall be confined and discharged at one point.

In all respects, so far as arrangement or operation of sieves, tailing-spout, gearing, and construction of the thrashing-cylinder, hulling-cylinder, and straw apron and picker are concerned, my machine may be in accordance with any of the approved grain thrashers and cleaners now used, as the leading idea of my invention is the adaptation of a thrashing and cleaning machine to the purpose of hulling as well as simply thrashing and cleaning, or vice versa—that is, the adaptation of a thrashing, hulling, and cleaning machine to the purpose of simply thrashing and cleaning, as occasion may require.

Many farmers cannot afford two separate machines, as very often they raise a large quantity of clover and a small quantity of wheat, or vice versa. Now, with my organization such farmers are furnished in one machine all that they require, and that, too, without any inconvenience being experienced in the use of the machine for any of the purposes that necessity may demand, it only being necessary to take out the device F, Fig. 1, and substitute the device J to convert it into a grain-machine, as shown in Fig. 2, or to take out the device J and substitute the device F to convert the machine from a grain-machine into a clover-machine, as shown in Fig. 1. The sieves of course must be finer when used for clover-seed than when used for grain. Therefore two sets of sieves will accompany each machine.

The machine is shown as adapted for being driven by a double "jack" and belts; but it may be driven by a single jack and belts.

What I claim as my invention, and desire to secure by Letters Patent, is—

1. In a combined clover thrasher and huller, the use of the detachable alternating chutes F J, substantially in the manner and for the purpose described.

2. In a combined clover thrasher and huller, the use, in combination, of the detachable alternating chutes F J and the carrier D', running close in relation with the top and bottom of the table D, substantially in the manner and for the purpose described.

3. In a combined clover thrasher and huller, in combination, the use of the detachable chutes F J, the flatwise-arranged carrier D', and the fanning device H I, the whole constructed, arranged, and operating in the manner and for the purpose described.

Witness my hand in the matter of my application for patent on improved combined thrasher, &c., for grain and clover.

HENRY HECKMAN.

Witnesses:
GEO. P. REYNALE,
C. R. KERN.